(12) United States Patent
Abe et al.

(10) Patent No.: US 7,353,899 B2
(45) Date of Patent: Apr. 8, 2008

(54) SNOWMOBILE WITH IMPROVED AIR INTAKE STRUCTURE

(75) Inventors: Tomohisa Abe, Saitama (JP); Kozo Yamada, Saitama (JP); Yosuke Hoi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 409 days.

(21) Appl. No.: 11/063,659

(22) Filed: Feb. 23, 2005

(65) Prior Publication Data
US 2005/0205318 A1 Sep. 22, 2005

(30) Foreign Application Priority Data
Mar. 11, 2004 (JP) ............... 2004-069032

(51) Int. Cl.
*B60K 11/08* (2006.01)
*B60K 13/02* (2006.01)
*F02M 35/02* (2006.01)

(52) U.S. Cl. ............... 180/68.3; 180/68.1; 123/198 E; 123/184.21

(58) Field of Classification Search ............... 180/186, 180/68.1, 68.3; 123/198 E, 184.21, 184.42; 55/385.3
See application file for complete search history.

(56) References Cited

U.S. PATENT DOCUMENTS

| 4,280,582 | A | * | 7/1981 | Kouyama et al. ........... 180/219 |
|---|---|---|---|---|
| 5,655,497 | A | * | 8/1997 | Nakajima ............... 123/198 E |
| 5,660,245 | A | * | 8/1997 | Marier et al. ............... 180/190 |
| 6,067,953 | A | * | 5/2000 | Bloomer ................. 123/198 E |
| 6,251,151 | B1 | * | 6/2001 | Kobayashi et al. ........... 55/309 |
| 6,802,383 | B2 | * | 10/2004 | Nishijima ................... 180/190 |
| 6,808,034 | B2 | * | 10/2004 | Nakano et al. ............. 180/190 |
| 6,923,287 | B2 | * | 8/2005 | Morii ......................... 180/292 |
| 7,188,696 | B2 | * | 3/2007 | Arnold ....................... 180/229 |
| 2002/0134603 | A1 | * | 9/2002 | Ashida et al. ............. 180/186 |
| 2003/0062209 | A1 | * | 4/2003 | Iyoda et al. ................ 180/282 |

FOREIGN PATENT DOCUMENTS

| JP | 61150825 A | * | 7/1986 |
|---|---|---|---|
| JP | 03014726 A | * | 1/1991 |
| JP | 03271089 A | * | 12/1991 |
| JP | 2002364468 A | | 12/2002 |

* cited by examiner

*Primary Examiner*—Lesley D. Morris
*Assistant Examiner*—Daniel Yeagley
(74) *Attorney, Agent, or Firm*—Carrier, Blackman & Associates, P.C.; William D. Blackman; Joseph P. Carrier (57) ABSTRACT

An improved snowmobile component layout structure includes an engine provided at front portion of the vehicle body, a cylinder head of the engine is inclined by an angle $\theta$ rearwards from a vertical axis, a steering shaft extends forwardly of the engine, and an air intake system, including an air cleaner, is provided at the rear side of the engine. In addition, a rider seat is provided on the rear side of the engine, and an elongated fuel tank is provided below the seat. The air cleaner has an improved disposition between the fuel tank and the engine. The inventive configuration narrows the spacing between an engine and a rider and concentrates mass to enhance turning performance.

20 Claims, 9 Drawing Sheets

SNOWMOBILE WITH IMPROVED AIR INTAKE STRUCTURE

CROSS-REFERENCE TO RELATED APPLICATIONS

The present invention claims priority under 35 USC 119 based on Japanese patent application No. 2004-069032, filed on Mar. 11, 2004, published on 22 Sep. 2005 as publication number 2005-254973. The subject matter of this priority documents is incorporated by reference herein.

BACKGROUND OF THE INVENTION

1. Field of the Invention

The present invention relates to a snowmobile in which a steering shaft is provided on the front side of an engine and an air intake system, including an air cleaner, is laid out on the rear side of the engine.

2. Description of the Background Art

Conventionally, there are known snowmobiles in which a steering shaft is provided on the rear side of an engine, and an air intake system is disposed between the engine and the steering shaft. For example, this configuration is disclosed in Japanese Patent Laid-open No. 2002-364468 (especially FIG. 1 thereof).

In Japanese Patent Laid-open No. 2002-364468, a snowmobile is disclosed which includes an engine, and a steering shaft. The steering shaft is disposed on the rear side of the engine, and an air intake passage is laid out between a main body of the engine and the steering shaft. The snowmobile has a structure in which the engine is mounted on a vehicle body frame so as to be inclined rearwards relative to the traveling direction of the snowmobile.

By laying out the engine on the front side of the steering shaft, an attempt is made to reduce the mounted height of the engine on the vehicle body, and thereby lower the center of gravity of the vehicle body. By doing so, the turning performance of the snowmobile is enhanced.

However, since the engine is laid out on the front side of the steering shaft, and the rider is seated on the rear side of the steering shaft, there is a limitation in reducing the space between the engine and the rider. In other words, it is difficult to concentrate the mass of the engine and the mass of the rider toward the center of the vehicle body, and thus there is a limitation in reducing the moment of inertia of the vehicle.

If the masses of the components of the vehicle can be concentrated toward the center of the vehicle body by reducing the intervening space between the engine and the rider, it is possible to reduce the moment of inertia, to enhance the turning performance of the snowmobile, and to permit a more pleasant traveling experience.

SUMMARY

Accordingly, it is an object of the present invention to reduce the intervening space between an engine and a rider, to concentrate the masses of the various vehicle components, and to enhance the pleasantness of the traveling experience.

A first aspect of the invention resides in a snowmobile comprising a track belt provided on a rear side of the vehicle body. The track belt is driven by an engine disposed at a front portion of the vehicle body. A left-right pair of skis is provided at front portions of the vehicle body. The skis are steered by operation of a steering handle. In the inventive snowmobile structure, a cylinder of the engine is inclined toward the rear of the vehicle, a steering shaft operatively connecting the steering handle and the skis extends forwardly of the engine, and an air intake system, including an air cleaner, is disposed rearwardly of the engine cylinder.

According to the first aspect of the invention, the cylinder of the engine is inclined rearwards. As a result, the center of gravity of the engine is disposed nearer to the rear side of the vehicle body. By using the construction in which the steering shaft is provided on the front side of the engine in addition to the rearward inclination of the engine, it is possible to lower the center of gravity of the engine, and to set the center of gravity of the vehicle body as a whole close to the center of the vehicle body. Therefore, the center of gravity of the vehicle body is concentrated in the vicinity of the vehicle body center, and the turning performance of the snowmobile is enhanced.

According to a second aspect of the invention, a throttle body is provided in an intake passage that communicates with the engine. The throttle body is integrally provided with an injector for injecting a fuel, and the injector is provided at an upper portion of the throttle body.

According to the second aspect of the invention, the throttle body is integrally provided with the injector for injecting the fuel, and the injector is provided on the upper side of the throttle body. As a result, gas stagnation of the fuel is prevented. In addition, the injector is more easily mounted to the throttle body.

According to a third aspect of the invention a snowmobile comprises a track belt provided at a rear side of the vehicle body. The track belt is driven by an engine disposed at a front portion of the vehicle body. A left-right pair of skis is provided at front portions of the vehicle body. The skis are steered by operation of a steering handle. The inventive snowmobile includes an air cleaner disposed rearwardly of the engine. The air cleaner is provided with an upper chamber at an upper portion thereof, and a lower chamber at a lower portion thereof, with an air-filtering element positioned between the upper chamber and the lower chamber. The left and right side surfaces of the upper chamber are each provided with an intake duct for taking in air, and an upper surface of the upper chamber is provided with a lid for maintenance.

According to the third aspect of the invention, the upper surface of the upper chamber is provided with the maintenance lid, so that it is possible to easily check the condition of the air-filtering element, and to easily detach and attach the air-filtering element.

According to a fourth aspect of the invention the intake duct is bent so that an intake port is directed downwards.

With such structure water, such as snow and ice, is restrained from penetrating into the air intake system through the intake port.

According to a fifth aspect of the invention rear end opening portions of the intake ducts are provided at both the left and right side surfaces of the upper chamber so as to be opposed to each other. A predetermined distance is provided between the opposed intake ducts.

According to the fifth aspect of the invention, the rear end opening portions of the intake ducts are disposed so as to be opposed and spaced apart by a predetermined distance, so that the closure of the rear end opening portion on one side can be complemented.

According to a sixth aspect of the invention, a snowmobile comprises a track belt provided on the vehicle body rear side. The track belt is driven by an engine disposed at a front portion of the vehicle body. A left-right pair of skis is provided at front portions of the vehicle body. The skis are steered by operation of a steering handle. The inventive snowmobile further comprises an air cleaner disposed rearwardly of the engine. The air cleaner includes an upper chamber at an upper portion thereof, a lower chamber at a lower portion thereof, and an air-filtering element provided between the upper chamber and the lower chamber. A plurality of intake pipes are provided in the inside of the lower chamber, and the intake pipes are attached to an air cleaner case using a set plate.

According to the sixth aspect of the invention, the intake pipes are attached to the air cleaner case via the set plate, so that it is unnecessary to prepare individual fastening members or the like for attaching each intake pipe, and the set plate is used in place of the individual fastening members or the like. As a result, the number of required fastening members is reduced.

According to a seventh aspect of the invention, an outer wall of each of the intake pipes is provided with a projection piece portion. The set plate is provided with slit portions for receiving the projection piece portions of the intake pipes therein. The intake pipes are positioned and fixed to the air cleaner case by communicating the projection piece portions into the slit portions and rotating the intake pipes by a predetermined angle relative to the set plate.

According to the seventh aspect of the invention, the set plate is provided with the slit portions for inserting the projection piece portions therein. The intake pipes are positioned and fixed to the air cleaner case by turning the intake pipes by a predetermined angle relative to the set plate, so that the operation for positioning and fixing the intake pipes to the air cleaner case is easily accomplished. As a result, the number of steps for assembling the intake pipes onto the air cleaner case is reduced.

Modes for carrying out the present invention are explained below by reference to an embodiment of the present invention shown in the attached drawings. The above-mentioned object, other objects, characteristics and advantages of the present invention will become apparent from the detailed description of the embodiment of the invention presented below in conjunction with the attached drawings.

BRIEF DESCRIPTION OF THE DRAWINGS

FIG. 9b is a side sectional view of the intake pipe being secured to the set plate of FIG. 9a.

DETAILED DESCRIPTION OF THE INVENTION

The best mode for carrying out the present invention will be described below, based on the accompanying drawings. In the figures and the following description, L is a subscript indicating the left as viewed from the driver, and R is a subscript indicating the right as viewed from the driver.

Figure 1:
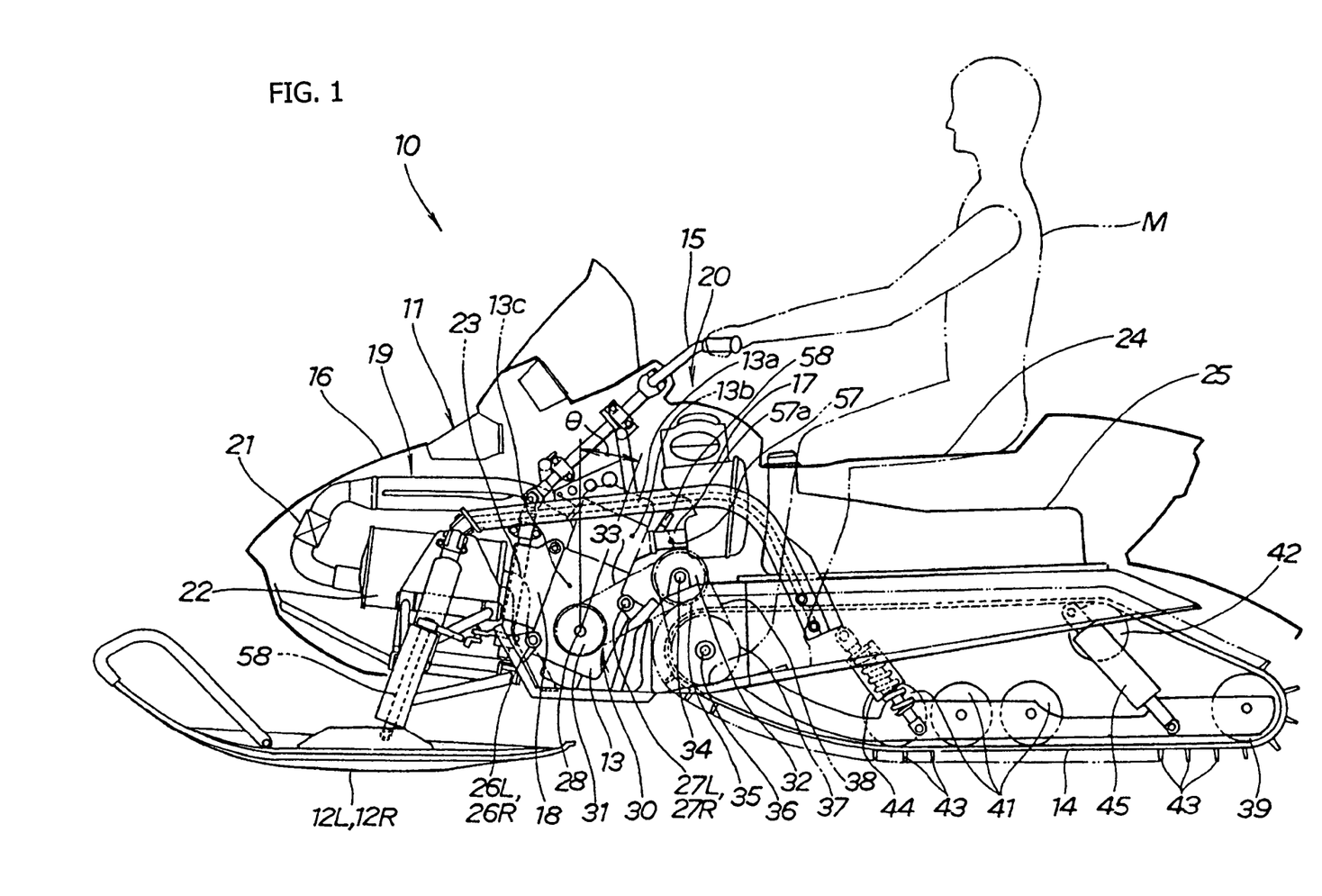
FIG. 1 is an overall side view of a snowmobile according to the present invention showing the shape and locations of the engine, muffler, air cleaning system, and steering shaft.

FIG. 1 is an overall side view of a snowmobile according to the present invention. The snowmobile 10 is a snow vehicle which comprises a left-right pair of skis 12L, 12R (12R is behind 12L, here and hereinafter), an engine 13, and a track belt 14, in this order from the front side toward the rear side of a vehicle body 11. The snowmobile travels by driving the track belt 14 by the power of the engine 13. The skis 12L, 12R are, steered by operating a steering handle 15. Further, a seat 24 for the rider is provided on the rear side of the engine 13. The engine 13 is provided at a front portion of the vehicle body. A fuel tank 25 is provided below the seat 24 and is elongated in the longitudinal (front-to-rear) direction of the vehicle.

In FIG. 1, a rider M is shown in place on the seat 24. The snowmobile further includes a cylinder head cover 13a, a cylinder head 13b, a cylinder 13c, a vehicle body cover 16, and an air cleaner 17. Also shown are an oil tank 18, an exhaust pipe 19, a catalytic converter 21, a muffler 22, a tail pipe 23, a throttle valve 57 within a throttle body 57a, and an injector 58.

First, an intake and exhaust system will be described. Air taken in through the air cleaner 17 is fed into a combustion chamber of the engine 13. An exhaust gas, generated upon combustion, is discharged into the atmosphere through the exhaust pipe 19, the catalytic converter 21, the muffler 22, and the tail pipe 23.

The tail pipe 23 extends from the muffler 22, then bends to extend transverse to the vehicle body, and bends again, whereby the exhaust gas is blown to the snow surface. Since the air cleaner 17 is disposed between the fuel tank 25 and the engine 13, inspection of the air cleaner 17 and replacement of an element is easily accomplished.

Next, a running system will be described. The engine 13 is mounted on a vehicle body frame using engine hangers 26L, 26R, 27L, 27R. A drive pulley 31 is fitted over a crankshaft 28 of the engine 13. A belt-type non-stage transmission 30 is constituted as follows: A continuously variable transmission (CVT) belt 33 is wrapped around both the drive pulley 31 and a driven pulley 32 disposed under the air cleaner 17. A cross shaft 34 for supporting the driven pulley 32 extends in the transverse direction of the vehicle. A first sprocket 35 is attached to the tip end of the cross shaft 34, and a chain 38 is wrapped around the sprocket 35 and a second sprocket 37 annexed to a drive wheel 36.

The power of the engine 13 is transmitted sequentially through the drive pulley 31, the CVT belt 33, the driven pulley 32, the cross shaft 34, the first sprocket 35, the chain 38, and the second sprocket 37, whereby the drive wheel 36 can be rotated to drive the snowmobile in the forward or reverse directions.

The track belt 14 is wrapped around the drive wheel 36, which is disposed at a front portion of the track belt 14. The track belt 14 is also wrapped around the driven wheel 39, which is disposed at a rear portion of the track belt 14. A plurality of rotary wheels 41 disposed at an intermediate lower portion of the track belt, and an idler 42 disposed at an upper portion of the track belt are also surrounded by the track belt 14. Projections 43 are provided on the outside surface of the track belt 14, and are driven into the snow surface to allow travel of the snowmobile. Vertical movements, generated during operation of the snowmobile over rugged snow surfaces and the like, are absorbed by rear shock absorbers 44, 45.

The cylinder 13c of the engine 13 is oriented so as to be inclined toward the rear of the vehicle. Specifically, the cylinder head 13b of the engine 13 is laid out so as to be inclined relative to a vertical axis by an angle θ to the rear side of the vehicle.

Figure 2:
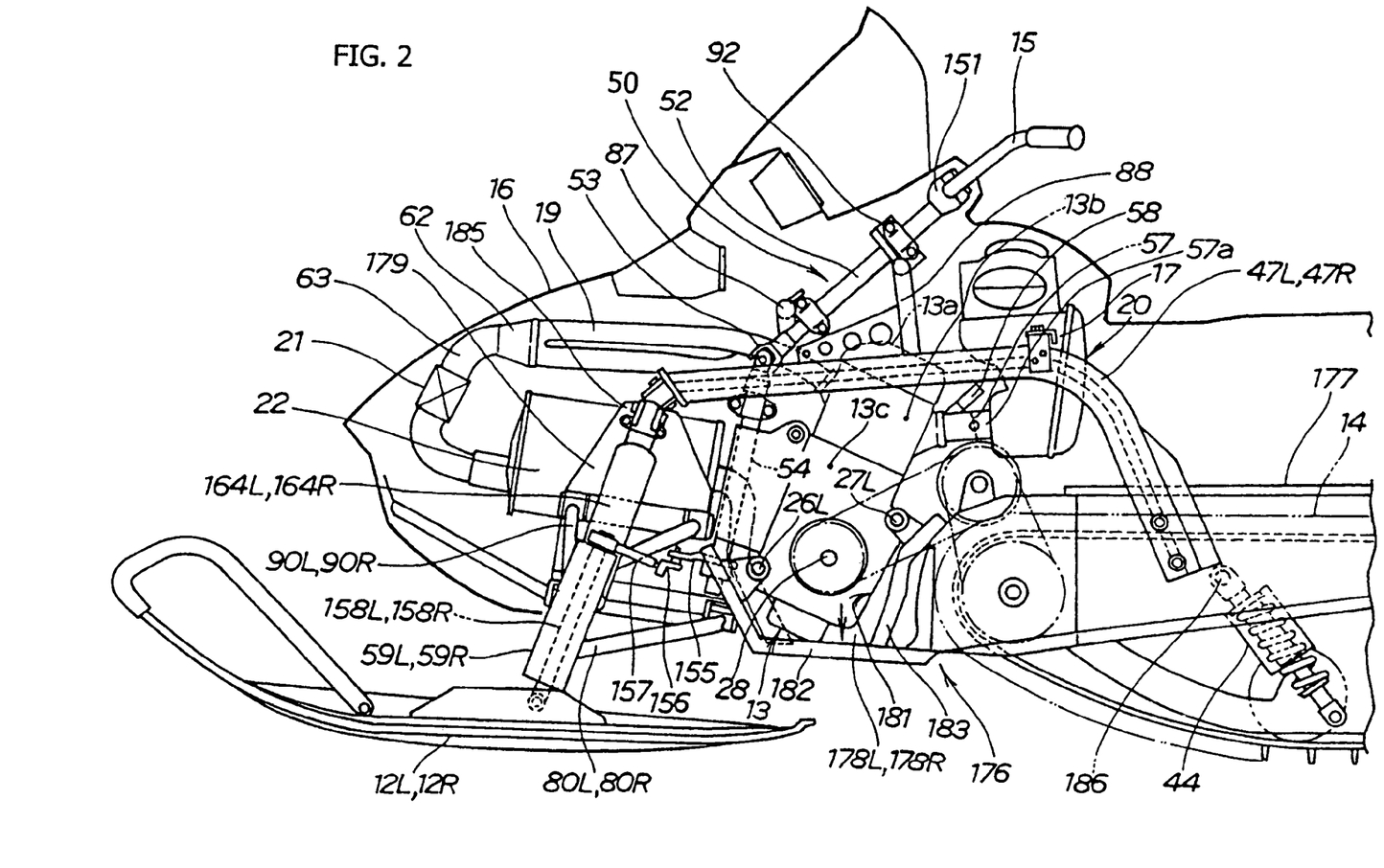
FIG. 2 is a partial side view of a front portion of the snowmobile according to the present invention showing the frame structures surrounding the engine.

A seen in FIG. 2, a throttle valve 57 is provided on the downstream side of the air cleaner 17, and an injector 58 is provided on the downstream side relative to the throttle valve 57. A throttle body 57a constituting the throttle valve 57 is provided in the intake passage which communicates with the engine 13. The throttle body 57a is integrally provided with the injector 58 for injecting the fuel, and the injector 58 is provided on the upper side of the throttle body 57a. As a result, gas stagnation of the fuel is prevented. In addition, the injector 58 is easily mounted thereon.

FIG. 2 is a side view of a front portion of the snowmobile according to the present invention, in which the steering handle 15 and the skis 12L, 12R are connected by use of a steering shaft 50 (described below) and links. The steering shaft 50 is composed of a steering shaft upper portion 52, a steering shaft lower portion 54, and a universal joint 53. The steering shaft upper portion is provided with a steering handle holder 51 at the top end thereof and is inclined downwards in the forward direction. The universal joint 53 is attached to the lower end of the steering shaft upper portion 52. The steering shaft lower portion 54 extends substantially vertically downwards from the universal joint 53.

A lever 155 is provided at the lower end of the steering shaft lower portion 54. A drive member 156 extends in the transverse direction of the vehicle and is connected to the lever 155. Levers 157 are attached respectively to the left and right ends of the drive member 156, and vertically directed spindles 158L, 158R are rotated about roughly vertical axes by the levers 157, whereby the skis 12L, 12R can be steered.

The spindles 158L, 158R are rotatably contained in front leg portions 59L, 59R. The front leg portions 59L, 59R are vertically movably supported by lower arms 80L, 80R, upper arms 90L, 90R and front suspensions 164L, 164R, which are vertically movably mounted to the vehicle body frame.

In addition, a characteristic feature of the invention lies in that the muffler 22 is disposed on the front side (the left side as seen in the figure) of the engine 13, and the steering shaft lower portion 54 of the steering shaft 50 passes between the muffler 22 and the engine 13. The engine 13 is disposed on the rear side of the steering shaft lower portion 54. Namely, the steering shaft lower portion 54 is disposed on the front side of the engine 13, so that the engine 13 can be easily moved rearwards.

There are two possible configurations relating the steering shaft 50 and the muffler 22. In one configuration, the steering shaft lower portion 54 passes on the front side of the muffler 22. In the other configuration, the steering shaft lower portion 54 passes between the muffler 22 and the engine 13.

If, as in the first configuration, the steering shaft lower portion 54 passes on the front side of the muffler 22, the overall length of the steering shaft 50 becomes large. From this point of view, the second configuration is preferred in the present invention. Specifically, the steering shaft lower portion 54 passes between the muffler 22 and the engine 13, so that a shortened steering shaft 50 is easily achieved.

In addition, a characteristic feature of the invention resides in that the universal joint 53 is interposed at an intermediate portion of the steering shaft 50, and the steering shaft lower portion 54 is set close to the engine 13. When the steering shaft lower portion 54 is set close to the engine 13, the muffler 22 can also be set close to the engine 13. As a result, it is possible to achieve concentration of mass in the vehicle body longitudinal direction.

The vehicle body frame 176 is a frame in which intermediate frames 178L, 178R formed in U shape in side view are connected to front portions of a rear frame 177. The rear frame 177 is roughly U shaped in section, opened to the lower side so as to straddle the top surface and the left and right side surfaces of the track belt 14. A front frame 179 is connected to front portions of the intermediate frames 178L, 178R. The vehicle body frame 176 is characterized in that a reinforcement as described below is applied to the intermediate frames 178L, 178R.

The intermediate frames 178L, 178R are made to be U-shaped in side view, and each is provided with a cutout portion 181 for permitting the crankshaft 28 or the like to pass therethrough. Since the intermediate frames 178L, 178R are U-shaped frames, it is desirable to apply appropriate reinforcement to the frames. In view of this, an L-shaped reinforcement member 182 and an I-shaped reinforcement member 183 are annexed to each of the intermediate frames 178L, 178R along the cutout portion 181, to thereby reinforce the cutout portion 181.

Further, an upper portion of the front frame 179 and a front upper portion of the rear frame 177 are connected by side frames 47L, 47R so as to cross the cutout portion 181. Specifically, the front suspensions 164L, 164R are mounted to the front frame 179, and the tip ends of the side frames 47L, 47R are connected in the vicinity of a suspension receiving portion 185, provided for mounting the front suspensions 164L, 164R to the vehicle body frame. The rear shock absorber 44 is mounted to the rear frame 177, and the rear ends of the side frames 47L, 47R are connected rear frame 177 in the vicinity of a shock absorber receiving portion 186, provided for mounting the shock absorber 44 to the rear frame 177. By this configuration, the front frame 179 and the rear frame 177 are firmly connected to each other.

Figure 3:
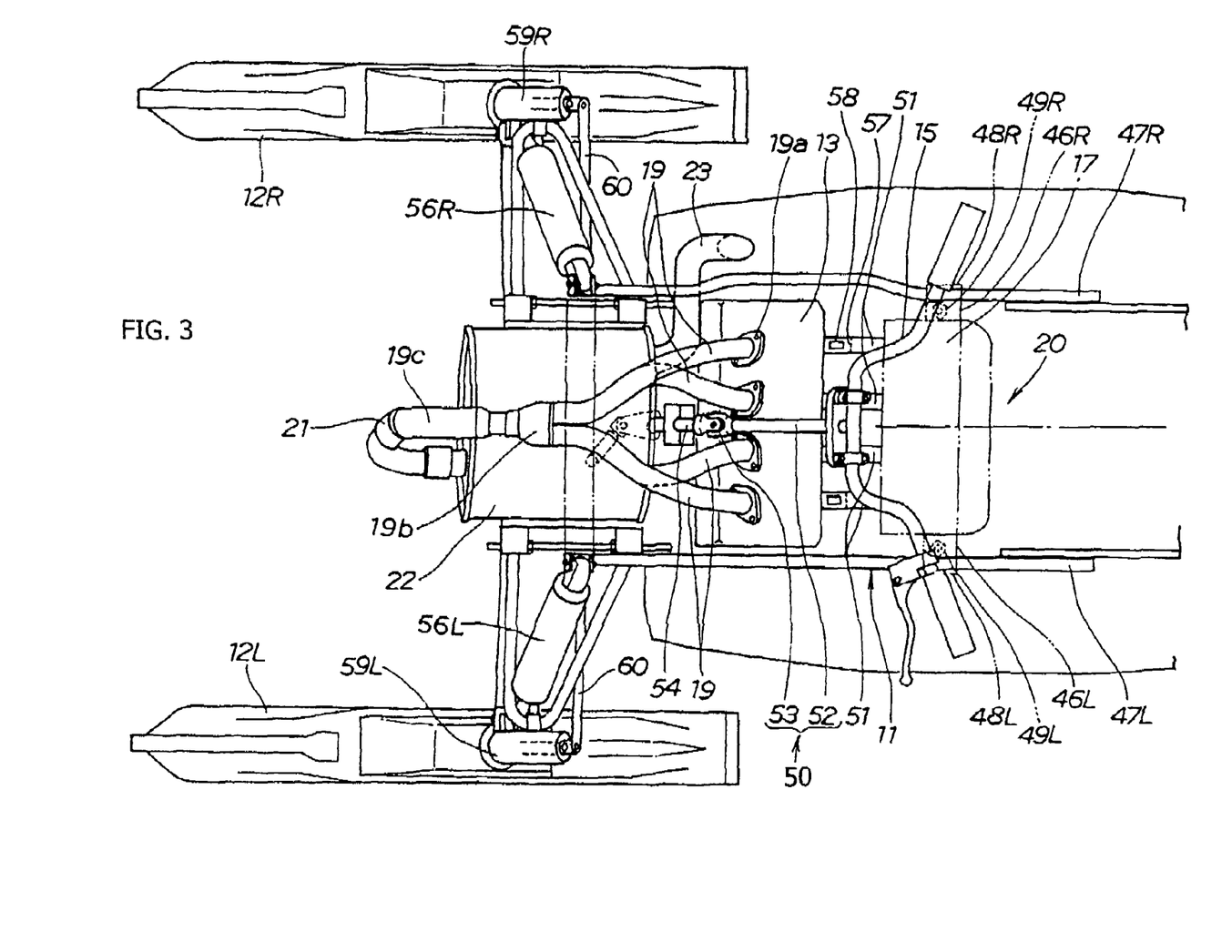
FIG. 3 is a plan view of the front portion of the snowmobile according to the present invention with the vehicle body cover omitted, showing alignment of the muffler and other exhaust system components with the vehicle longitudinal center line.

FIG. 3 is a plan view of a front portion of the snowmobile according to the present invention in which the vehicle body cover is omitted. As seen in the figure, the air cleaner 17 is mounted onto an upper side of left and right side frames 47L, 47R. Mounting is achieved using left and right cleaner fixing brackets 48L, 48R extending from the left and right side frames 47L, 47R. The air cleaner includes fixing portions 46L, 46R that extend outwardly to the left and right sides from the outer surface of the air cleaner lower case 69. The fixing portions 46L, 46R and the cleaner fixing brackets 48L, 48R (hereinafter referred to as the brackets) are clamped together between fastening means 49L, 49R.

Also shown in FIG. 3 is the steering shaft 50, composed of a steering shaft upper portion 52, a universal joint 53, and a steering shaft lower portion 54. Steering shaft 50 is provided on the front side of the engine 13. As has been described above, an air intake system 20 including the air cleaner 17 is provided on the rear side of the engine 13. An air supply pipe 51 is provided for supplying air from the air cleaner 17 to the engine 13. Also seen in this figure are left and right front suspensions 56L, 56R, a throttle valve 57, an injector generally indicated at 58, left and right front leg portions 59L, 59R, and a drive member 60.

Figure 4:
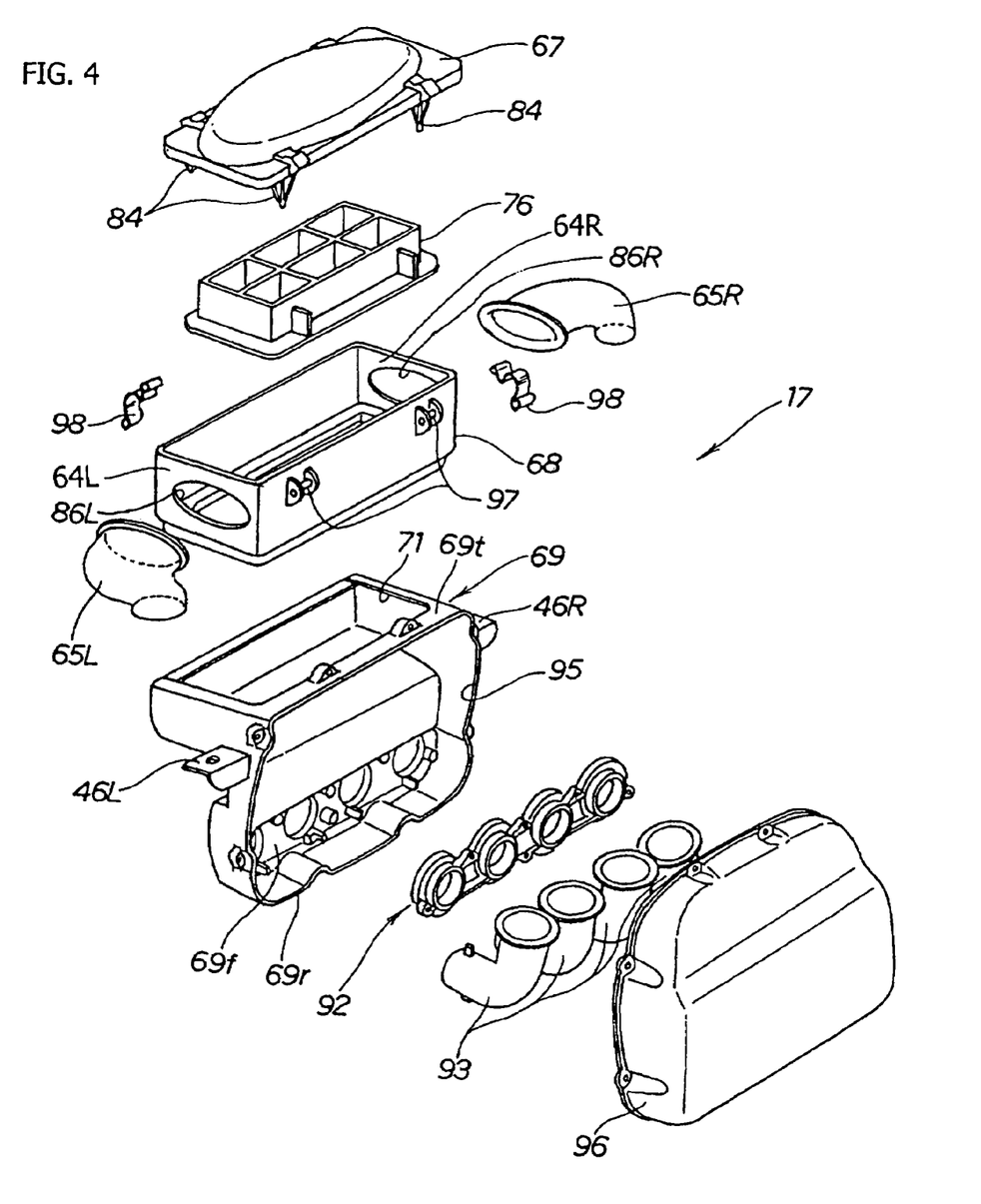
FIG. 4 is an exploded perspective view of an air cleaner according to the present invention, showing the two air intake ducts provided on opposed sides of the upper case, and plural air intake pipes provided within the lower case.

FIG. 4 is an exploded perspective view of the air cleaner 17 according to the present invention. The air cleaner 17 is composed of an element case 76 which includes an air cleaning element (referred to hereinafter as "an element") therein. The air cleaner 17 also includes an upper case 68 for containing the element case 76 therein, and a maintenance lid 67 to selectively close the upper case 68. Also included are intake ducts 65L, 65R annexed to left and right side surfaces of the upper case 68, and a lower case 69 connected to the bottom of the upper case 68. The lower case encloses plural intake pipes 93, and a set plate 92 for fixing the intake pipes 93 to the lower case 69. A cover portion 96 closes the lower case 69.

The air cleaner 17 is assembled as follows: The set plate 92 is mounted in the inside of a lower portion front side surface 69f of the lower case 69. The intake pipes 93 are attached to the set plate 92 through cooperation of corresponding fittings formed on both the intake pipes 93 and the set plate 92, and the set plate 92 and intake pipes are covered with the cover portion 96.

Next, the upper case 68 is fitted from the upper side of the air cleaner 17 into a top opening portion 71 of the lower case 69. The element case 76, which surrounds the element, is fitted in position within the upper case 68, and the maintenance lid 67 is removably mounted onto the element case 76 through a lid fixing member 98.

Finally, the intake ducts 65L, 65R are attached to left and right side surfaces 64L, 64R of the upper case 68. The sectional configuration of the air cleaner 17 thus assembled is shown in FIG. 5 and will be described below.

Figure 5:
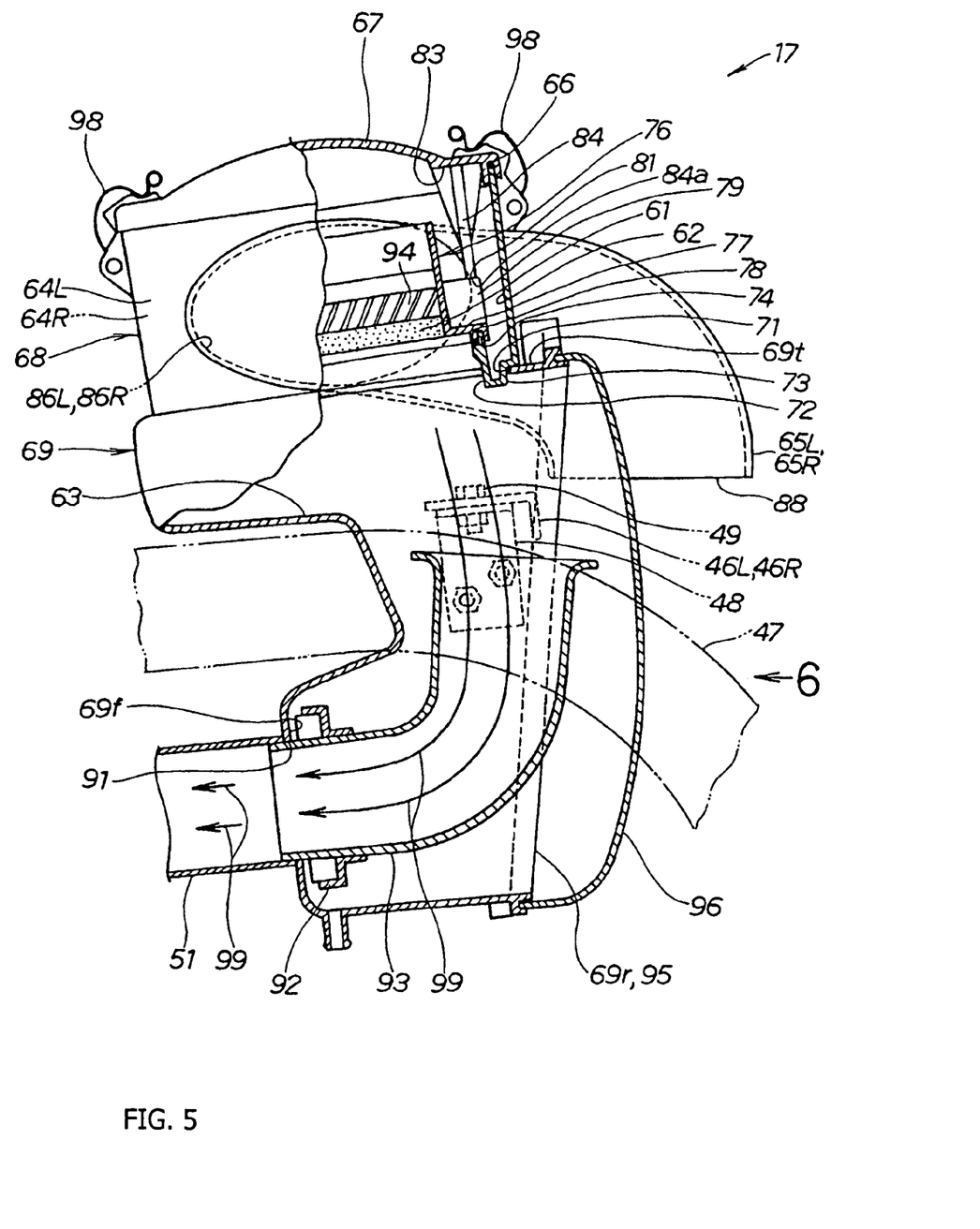
FIG. 5 is a side sectional view of the air cleaner according to the present invention showing the air cleaning element disposed between the upper case and the lower case.

FIG. 5 is a sectional view of the air cleaner according to the present invention, in which the element case 76 is a component part. The element case 76 comprises rectifying vanes 94 formed integrally within a tubular body having an exterior circumferential flange portion 77. The air cleaning element 61 is disposed at a lower side of the element case 76 adjacent to the rectifying vanes 94.

An upper chamber 62 is provided within the upper case 68 on the upper side of the element 61 for filtering air 99. A lower chamber 63 is provided within the lower case 69 on the lower side of the element 61. In other words, the upper chamber 62 is formed by the upper case 68, and the lower chamber 63 is formed by the lower case 69.

The lower case 69 is fixed to the side frame 47 via the bracket 48. An opening portion 72 is formed in the bottom surface of the upper case 68A. A side portion 73, provided at the periphery of the opening portion 72, is fitted into an opening hole 71 provided in the top surface 69t of the lower case 69.

The upper case 68 may be attached to the lower case 69 by use of an adhesive, fusing, or fitting. Then, a recessed portion 78, provided in the down-directed surface of the flange portion 77 at a lower portion of the element case 76, is fitted over a projected portion 74 formed in the inside of the upper case 68.

Next, vertical members 79 are disposed adjacent to the periphery of the element case 76. The vertical members 79 extend orthogonally to both the flange portion 77 and the element case 76. In addition, leg portions 84 extend downwards from the lower surface 83 of the maintenance lid 67 toward top surfaces 81 of the vertical members 79. The tip ends 84a of the leg portions 84 are caused to abut on the top surfaces 81 of the vertical members 79.

Therefore, the element case 76 is fixed in the inside of the upper chamber 62 of the upper case 68 by means of both the projected portion 74 of the upper case 69 residing within the recessed portion 78 of the element case 76, and the top surfaces 81 of the vertical members 79 in an abutting relationship with the tip ends 84a of the leg portions 84 of the maintenance lid 67.

Both left and right side surfaces 64L, 64R (the surface on the opposite side of 64L) of the upper chamber 62 are provided with rear end opening portions 86L, 86R oppositely to each other, and the intake ducts 65L, 65R are attached to the rear end opening portions 86L, 86R from the respective left and right sides. The intake ducts 65L, 65R are shaped having a bend therein so that intake ports 88, 88 are directed downwards.

The front side surface 69f of a lower portion of the lower case 69 is provided with air output holes 91, and the intake pipes 93 are attached to the air output holes 91 using the set plate 92. The rear side surface 69r of the lower portion of the lower case 69, which is a surface opposed to the air outlet holes 91, defines a large opening portion 95. The cover portion 96 is mounted in position over the large opening portion 95 so as to cover the large opening portion 95.

Figure 6:
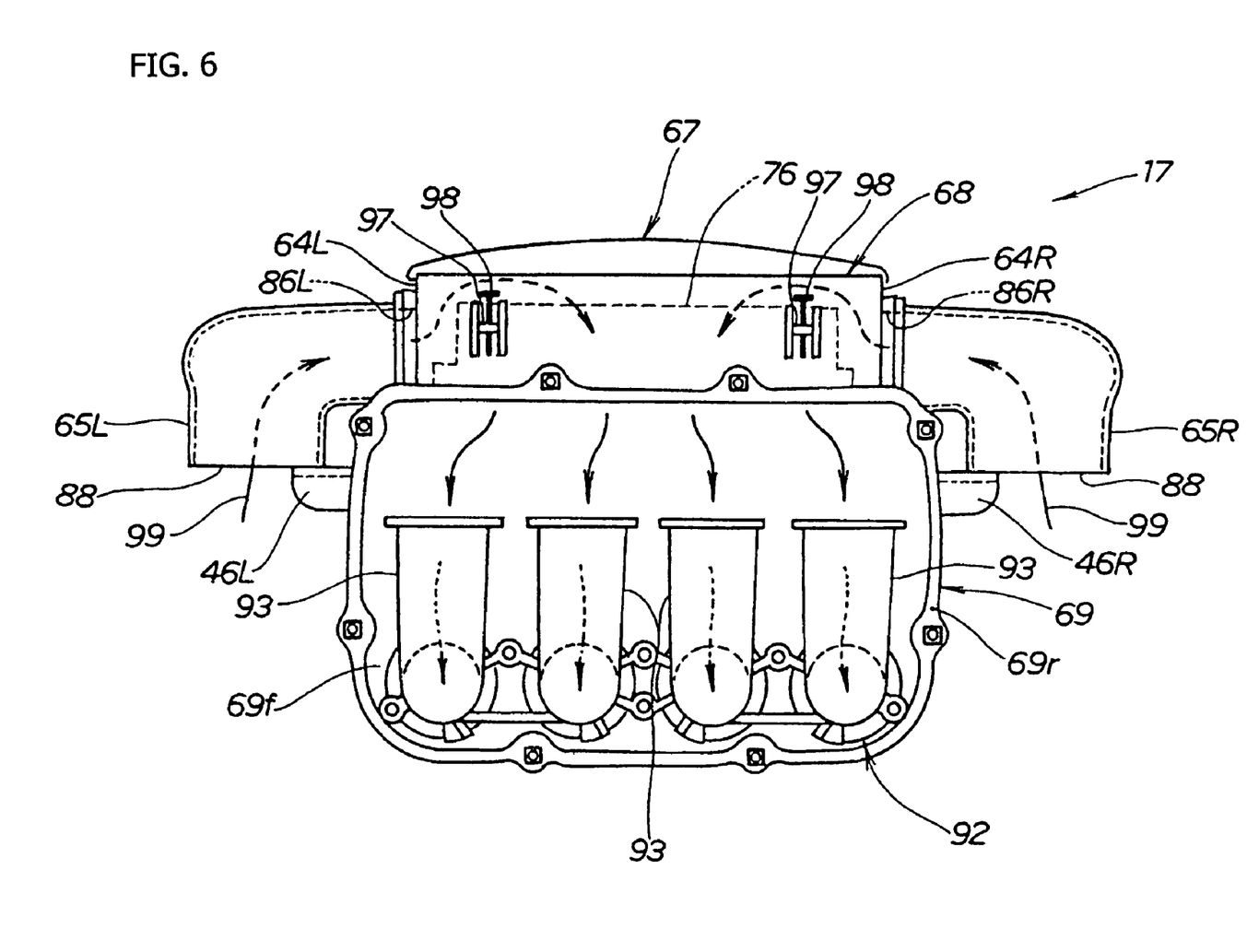
FIG. 6 is a view along arrow 6 of FIG. 5 showing the air cleaner with a cover portion removed and using arrows to illustrate the air flow pathways through the air cleaner.

FIG. 6 is a view along arrow 6 of FIG. 5 in which the cover portion 96 has been removed. In this figure, the intake ducts 65L, 65R for taking in air are disposed on both the left and right side surfaces 64L, 64R of the upper case 68. The rear end opening portions 86L, 86R of the upper case intake ducts 65L, 65R are disposed opposite to each other with a predetermined interval therebetween, so that the closure of the intake duct on one side can be complemented.

In the figure, when the cover portion 96 (see FIG. 4) of the lower case 69 is removed, the set plate 92, and the plurality of intake pipes 93 attached to the set plate 92, can be visually checked. The mounting structure of the plural intake pipes 93 will be described in detail later.

The functions of the air cleaner 17 will now be described. The air 99 taken in through the intake ports 88 of the intake ducts 65L, 65R enters the upper case 68, flows around from the upper side to be filtered by the element 61 (see FIG. 3) surrounded by the element case 76. The air 99 then enters the lower case 69, and passes through the intake pipes 93 mounted to the lower case 69.

Returning to FIG. 5, the air 99, having passed through the intake pipes 93, enters into the air supply pipe 51, and is supplied to the engine side. Since the intake ducts 65L, 65R are bent so that their intake ports 88 are directed downwards, water, such as snow and ice, is restrained from penetrating into the air cleaner 17 through the intake ports 88.

Figure 7A:
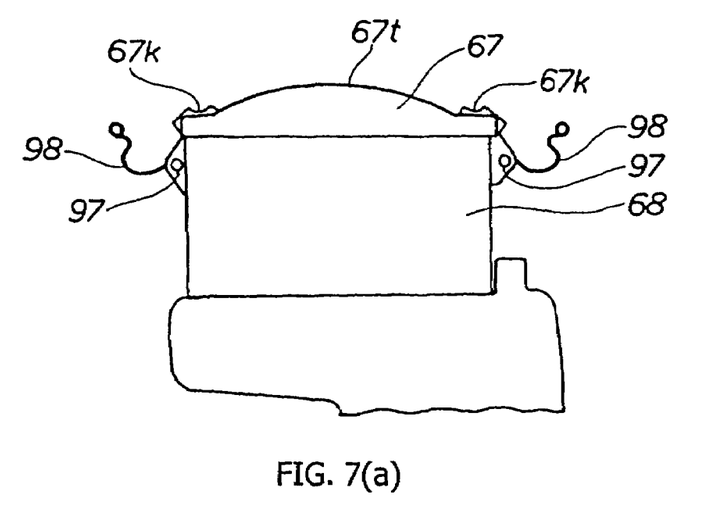
FIG. 7a is a side view of the upper portion of the air cleaner, showing the lid in place on the upper case with the lid fixing members released from the lid.
Figure 7B:
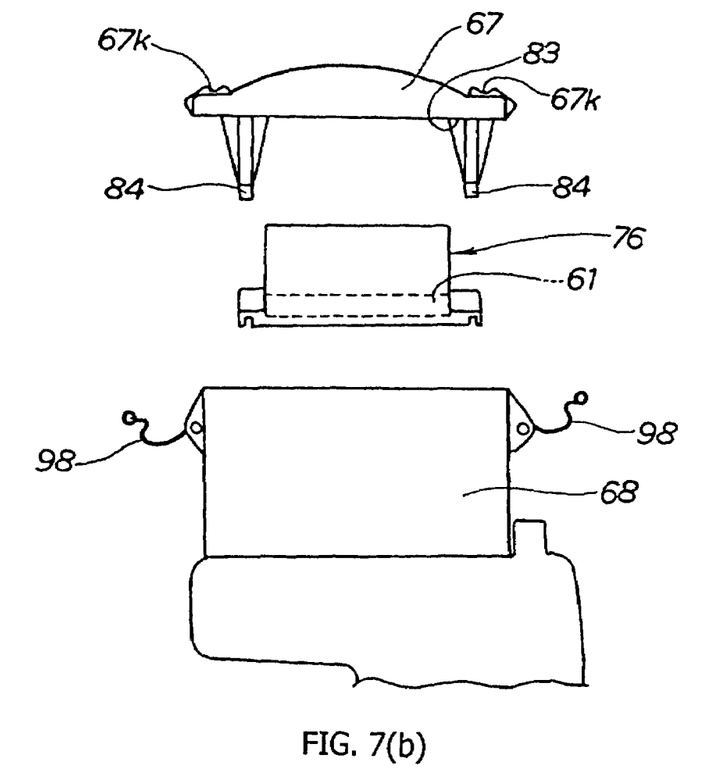
FIG. 7b is a side view of the upper portion of the air cleaner of FIG. 7a, showing lid removed from the upper case by lifting the lid upwards relative to the upper case, and showing the element case removed from the upper case in a similar manner.

FIGS. 7a and 7b illustrate the general procedure for accessing the air cleaning element 61, showing that maintenance such as checking of the element 61 and replacement of the element 61 is easily carried out. In FIG. 7a, lid fixing members 98 are provided at support shafts 97 formed on side surfaces of the upper case 68. The lid fixing members 98 are disengaged from fitting portions 67k provided on the top surface 67t of the maintenance lid 67.

In FIG. 7b, the maintenance lid 67 is removed from the upper side of upper case 68. The element case 76, having been maintained in position within upper case 68 by the lid leg portions 84 projecting downwards from the lower surface 83 of the maintenance lid 67, is lifted up out of the upper case 68. Since the restriction of the element case 76 by the lid leg portions 84 is removed, the element case 76, incorporating the element 61 therein, can be easily removed from the upper case 68. Therefore, the condition of the element 61 is easily visually checked, and the element 61 is easily detached and attached from the element case 76.

Figure 8:
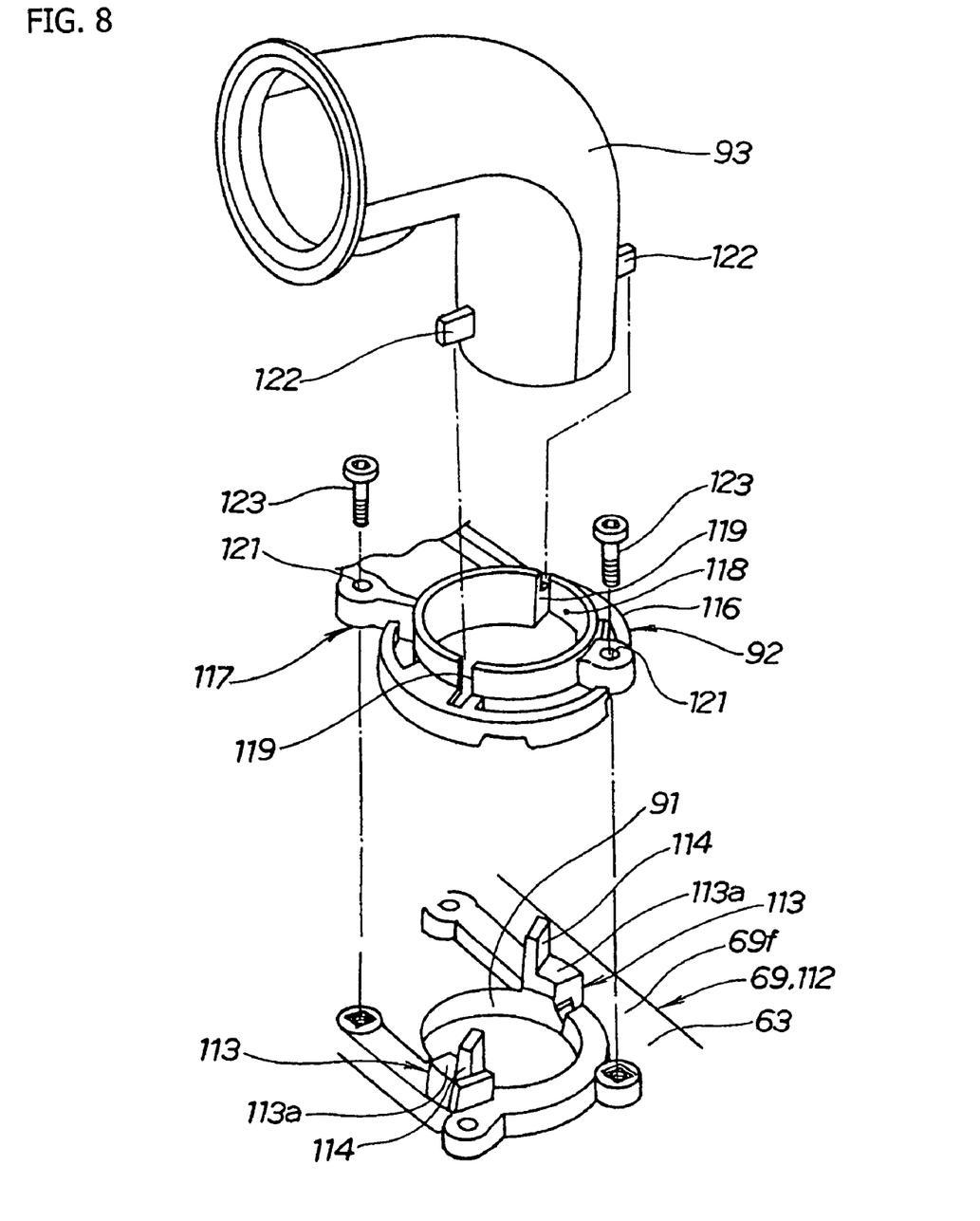
FIG. 8 is a perspective view of an intake pipe and a portion of the set plate according to the present invention, showing the two, opposed projection piece portions extending outward from the exterior of the intake pipe, and the corresponding slit portions formed in the set plate for receiving the projection piece portions therein.

FIG. 8 is a perspective view of the intake pipe and the set plate according to the present invention. Since the manner of mounting the intake pipes 93 is the same for each of the intake pipes 93, the following description will be made referring to one intake pipe 93. The intake pipe 93 is provided in the inside of the lower chamber 63, and the intake pipe 93 is attached to the air cleaner case 112 (corresponding to the lower case 69) through the set plate 92. In this embodiment, the air cleaner case 112 indicates the lower case 69.

The lower case 69 comprises small projected portions 113, 113 disposed diagonally at the circumference of the air output hole 91 bored in the lower portion front side surface 69f thereof, and stopper portions 114, 114 disposed at end portions of the small projected portions 113, 113. The set plate 92 is composed of flange portions 116, and a connection portion 117 for connecting the flange portions 116 to each other. The connection portion 117 is provided with plural set plate mounting holes 121.

The flange portions 116 are provided with an intake pipe insertion hole 118, and a pair of slit portions 119, 119 are disposed at diametrically opposed positions at the circumference of the intake pipe insertion hole 118. One end of the intake pipe 93 is provided with two projection piece portions 122, 122. The projection piece portions 122, 122 are disposed at diametrically opposed positions at the circumference of, and extending outward from the exterior surface of, the intake pipe 93.

The set plate 92 is preliminarily mounted to the lower case 69 by fastening bolts 123. The projection piece portions 122, 122 of the intake pipe 93 are then inserted into the slit portions 119, 119 provided in the set plate 92, and the intake pipe 93 is secured thereon by turning the intake pipe relative to the set plate 92 to a predetermined angle.

Since the intake pipe 93 is mounted to the air cleaner case 112 by the set plate 92, it is unnecessary to prepare individual fastening members or the like for mounting each of the intake pipes 93, and such fastening members or the like can be substituted by the set plate 92. Since the set plate 92 is used as a substitute for such individual fastening members or the like, it is possible to reduce the number of fastening members required.

FIGS. 9a-f show functional views of the structure of FIG. 8, in which an outer wall 93a of the intake pipe 93 is provided with the projection piece portions 122, the set plate 92 is provided with the slit portions 119 for inserting the projection piece portions 122 therein, the projection piece portions 122 communicate with the slit portions 119, and the projection piece portions 122 are turned by a predetermined angle, whereby the intake pipe 93 is positioned and fixed to the air cleaner case 112.

Figure 9A:
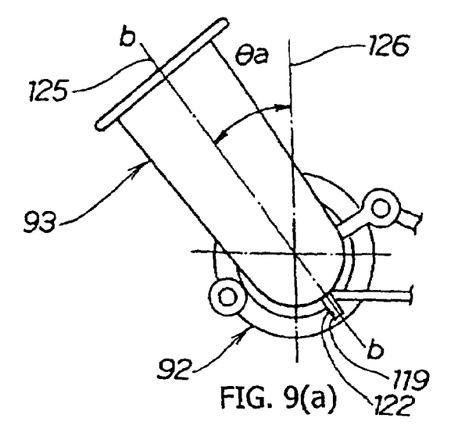
FIG. 9a is an end view of an intake pipe being secured to the set plate, showing that when the center axis of the intake pipe is inclined by an angle θa to the vertical, the projection piece portions are aligned with the slit portions of the set plate, and can be inserted therein.

FIG. 9a shows that, in the condition where the center axis 125 of the intake pipe 93 is inclined to the left side by an angle θa from the vertical axis 126, the projection pieces 122 of the intake pipe 93 are matched to the positions of the slit portions 119 and are inserted into the slit portions 119.

Figure 9B:
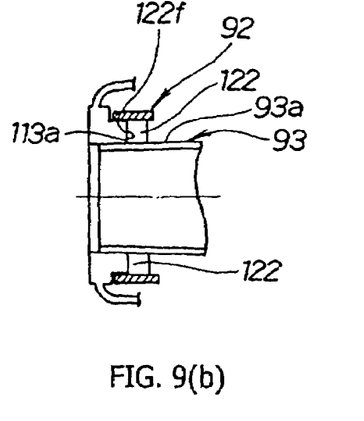

FIG. 9b is a sectional view along line b-b of (a), in which the tip end surfaces 122f of the projection piece portions 122 are in abutment on the surfaces 113a of the small projected portions 113 provided on the lower case.

Figure 9C:
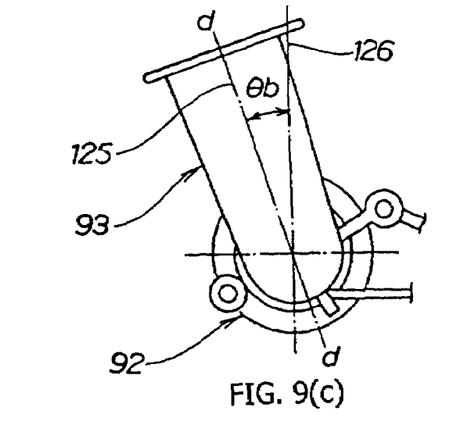
FIG. 9c is an end view of an intake pipe being secured to the set plate, showing that when the intake pipe is rotated relative to the set plate so that the center axis of the intake pipe is inclined by an angle θb to the vertical, the projection piece portions are shifted circumferentially away from the slit portions within the set plate.

In FIG. 9c, the center axis 125 of the intake pipe 93 has been turned from the angle θa to an angle θb (θb<θa).

Figure 9D:
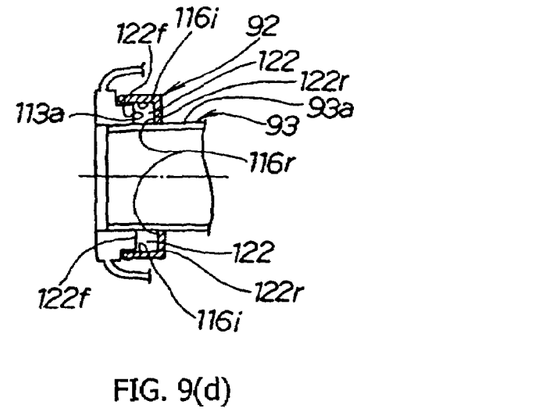
FIG. 9d is a side sectional view of the intake pipe being secured to the set plate of FIG. 9c.

FIG. 9d is a sectional view along line d-d of (c), showing the condition in which the tip end surfaces 122f of the projection piece portions 122 are in abutment on the surfaces 113a of the small projected portions 113 provided on the lower case, the rear end surfaces 122r of the projection piece portions 122 are in abutment on a flange back surface 116r of the set plate 92, and the outer wall 93a of the intake pipe 93 is in abutment on a flange inner circumferential surface 116i of the set plate 92. Namely, the intake pipe 93 is turned while being restricted by the lower case 69 and the set plate 92.

Figure 9E:
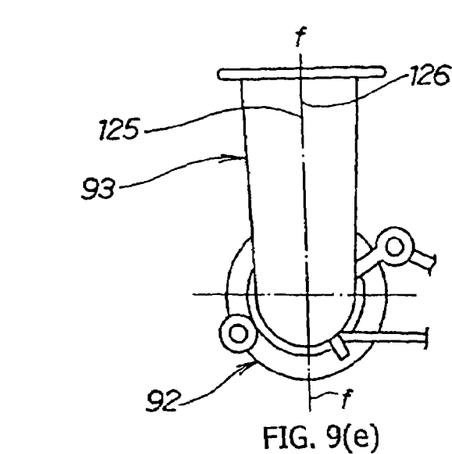
FIG. 9e is an end view of an intake pipe being secured to the set plate, showing that when the intake pipe is further rotated relative to the set plate so that the center axis of the intake pipe is aligned with the vertical, the projection piece portions are shifted further circumferentially away from the slit portions within the set plate.

In FIG. 9e, the center axis 125 of the intake pipe 93 has been turned from the angle θb (0<θb) until it coincides with the vertical axis 126.

Figure 9F:
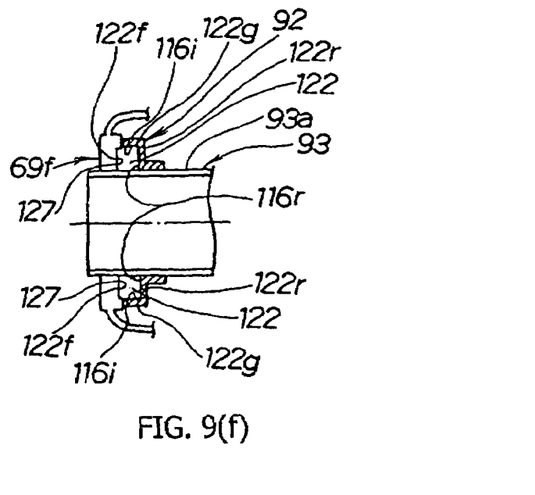
FIG. 9f is a side sectional view of the intake pipe being secured to the set plate of FIG. 9e.

FIG. 9f is a sectional view along line f-f of (e), showing the condition where the tip end surfaces 122f of the projection piece portions 122 are in contact with a set portion 127 provided in the lower case 69, the rear end surfaces 122r of the projection piece portions 122 are in abutment on the flange back surface 116r of the set plate 92, and the outer wall 93a of the intake pipe 93 is in abutment on the flange inner circumferential surface 116i of the set plate 92.

In this case, the dimensions of outer circumferential surfaces 122g of the projection piece portions 122 of the intake pipe 93 and the flange inner circumferential surface 116i of the set plate 92 are set respectively within predetermined tolerances, and the turned intake pipe 93 can thereby be fixed to the set plate 92 and the lower case 69.

Since the set plate 92 is provided with the slit portions 119 for insertion of the projection piece portions 122 therein, and the intake pipe 93 is positioned and fixed to the air cleaner case 112 by rotating the projection piece portions 122 by a predetermined angle, the operation for positioning and fixing the intake pipe 93 is easily carried out. As a result, the intake pipes 93 are securely mounted to the air cleaner case 112. In addition, the number of assembling steps is reduced.

Returning to FIG. 1, in addition to the rearward inclination of the engine 13, the steering shaft 50 is passed on the front side of the engine 13, and the intake system 20 including the air cleaner 17 is provided on the rear side of the cylinder 13c constituting the engine 13. Therefore, the center of gravity of the engine is lowered, and the center of gravity of the vehicle body as a whole is set close to the center of the vehicle body. As a result, the snowmobile turning performance is enhanced, and a more pleasant traveling experience is achieved.

While a working example of the present invention has been described above, the present invention is not limited to the working example described above, but various design alterations may be carried out without departing from the spirit and scope of the present invention as set forth in the claims.

What is claimed is:

1. A snowmobile comprising
a vehicle body,
an engine disposed at a front portion of the vehicle body, the engine comprising at least one cylinder,
a steering handle,
an air intake system comprising an air cleaner,
a track belt provided at a rear side of the vehicle body, said track belt being driven by the engine,
a left-right pair of skis provided at front portions of said vehicle body, said skis being steered by an operation on the steering handle, and
a steering shaft operatively connecting the steering handle and the skis,
wherein the at least one cylinder of said engine is inclined rearwards, the steering shaft extends forwardly of said engine, and the air intake system is disposed rearwardly of said at least one cylinder; and
wherein said air cleaner comprises
an air cleaner case,
an upper chamber;
a lower chamber;
an air filtering element disposed between the upper chamber and the lower chamber,
a plurality of air intake pipes operatively connected said lower chamber, and
a set plate having a connection portion and a plurality of flange portions connected to each other by said connection portion;
wherein
said intake pipes are attached to the air cleaner case using the set plate.

2. The snowmobile as set forth in claim 1, wherein the snowmobile further comprises a throttle body provided in an air intake passage of the air intake system that communicates with said engine, the throttle body is integrally provided with an injector for injecting a fuel, and said injector is provided at an upper portion of said throttle body.

3. The snowmobile as set forth in claim 1, wherein the snowmobile further comprises a muffler disposed on the vehicle body such that the steering shaft extends between the muffler and the engine.

4. The snowmobile as set forth in claim 1, wherein the steering shaft comprises an upper portion, a lower portion, and a universal joint disposed between the upper portion and the lower portion, wherein the lower portion of the steering shaft is positioned adjacent to the engine.

5. The snowmobile as set forth in claim 1, wherein
said air cleaner case includes vanes extending integrally from an interior surface thereof, and a flange extending circumferentially about an outer surface thereof, and
wherein the air filtering element is disposed adjacent to the vanes.

6. A snowmobile comprising
a vehicle body,
a steering handle,
an engine disposed at a front portion of the vehicle body,
a track belt provided at a rear side of the vehicle body, said track belt being driven by the engine,
a left-right pair of skis provided at front portions of said vehicle body, said skis being steered by operation of the steering handle, and
an air cleaner provided at a rear side of said engine, wherein
the air cleaner includes an upper chamber at an upper portion thereof, a lower chamber at a lower portion thereof, and an air-filtering element disposed between the upper chamber and the lower chamber, and the upper chamber having opposed right and left side surfaces, wherein
each respective left and right side surface of said upper chamber is provided with an intake duct for taking in air, and an upper surface of said upper chamber is provided with a lid for maintenance;
wherein the air cleaner further comprises a tube-shaped air cleaning element case, the case comprising vanes extending integrally from an interior surface of the case, and a flange extending circumferentially about an outer surface of the case,
wherein the air filtering element is disposed adjacent to the vanes.

7. The snowmobile as set forth in claim 6, wherein each said intake duct comprises an intake port, and wherein each said intake duct is bent so that the intake port is directed downwards.

8. The snowmobile as set forth in claim 6, wherein
each said intake duct comprises a rear end opening portion at an end thereof, and
said rear end opening portions of said intake ducts are provided at respective said left and right side surfaces of said upper chamber so that the rear end opening portions are opposed to each other, and a predetermined spacing is provided between the respective rear end opening portions.

9. The snowmobile as set forth in claim 6, wherein the air cleaning element case houses the air-filtering element, and the air cleaning element case is housed within the upper chamber.

10. The snowmobile as set forth in claim 6, wherein the air cleaner further comprises a lid,
wherein the element case is received within the upper chamber, and
the lid is positioned on an upper surface of the upper chamber,
wherein the lid comprises projections, the projections extend downward from a lower surface of the lid, the projections abutting the element case so as to maintain the element case within the upper chamber.

11. The snowmobile as set forth in claim 6, wherein said engine comprises at least one cylinder, and wherein said at least one cylinder of said engine is inclined rearwards.

12. The snowmobile as set forth in claim 6, further comprising a steering shaft operatively connected to the steering handle, wherein the steering shaft comprises an upper portion, a lower portion, and a universal joint disposed between the upper portion and the lower portion, wherein the lower portion of the steering shaft is positioned adjacent to the engine.

13. A snowmobile comprising
a vehicle body,
an engine disposed at a front portion of the vehicle body,
a steering handle,
a track belt provided at a rear side of the vehicle body, said track belt being driven by the engine,
a left-right pair of skis provided at front portions of said vehicle body, said skis being steered by operation of the steering handle, and
an air cleaner, the air cleaner comprising
an air cleaner case,
an upper chamber at an upper portion of the air cleaner,
a lower chamber at a lower portion of the air cleaner,
an air filtering element positioned between the upper chamber and the lower chamber,
a plurality of air intake pipes provided within said lower chamber, and
a set plate,
wherein
the air cleaner is provided at a rear side of said engine,
said intake pipes are attached to the air cleaner case using the set plate;
the set plate includes a plurality of flange portions, and
said flange portions are connected to each other by a connection portion.

14. The snowmobile as set forth in claim 13, wherein
each of said intake pipes comprises an outer wall having a projection piece portion formed thereon, and
said set plate comprises slit portions for inserting said projection piece portions of said intake pipes therein, wherein
said intake pipes are positioned and fixed to said air cleaner case by operatively engaging said projection piece portions into said slit portions.

15. The snowmobile as set forth in claim 13, wherein said set plate further includes openings defined therethrough, and slit portions extending continuously form the openings, and wherein
said intake pipes are operatively engaged in said slit portions by inserting ends of the intake pipes into said openings such that the projection piece portions of the intake pipes engage the slit portions, and then rotating said intake pipes by a predetermined angle relative to the set plate.

16. The snowmobile of claim 13, wherein the set plate comprises a plurality of openings, each of said openings surrounded by a flange, having the flange portions, the flange comprising slits formed in diametrically opposed inner peripheral edges thereof, and wherein
each of said intake pipes comprises a pair of projections formed on an outer surface thereof, the projections arranged so as to be on diametrically opposed sides of the intake pipe, and
said intake pipes are secured to said openings of said set plate by disposing the projections within the slits such that the intake pipe is secured to the set plate due to operative engagement between the projections and the flange portions.

17. The snowmobile of claim 13 wherein the set plate operatively engages one end of each of the intake pipes so as to maintain the intake pipes in a desired position and orientation with respect to the air cleaner case.

18. The snowmobile of claim 13, further comprising a steering shaft operatively connecting the steering handle and the skis, wherein the steering shaft extends forwardly of said engine.

19. The snowmobile as set forth in claim 13, wherein said engine comprises at least one cylinder, and wherein said at least one cylinder of said engine is inclined rearwards.

20. The snowmobile as set forth in claim 13, further comprising a steering shaft operatively connected to the steering handle, wherein the steering shaft comprises an upper portion, a lower portion, and a universal joint disposed between the upper portion and the lower portion, wherein the lower portion of the steering shaft is positioned adjacent to the engine.

* * * * *